United States Patent
Seno et al.

(10) Patent No.: US 11,296,349 B2
(45) Date of Patent: Apr. 5, 2022

(54) CELL STACK DEVICE, MODULE, AND MODULE HOUSING DEVICE

(71) Applicant: KYOCERA Corporation, Kyoto (JP)

(72) Inventors: Hiroaki Seno, Kirishima (JP); Tetsuro Fujimoto, Kirishima (JP); Makoto Koi, Kirishima (JP); Tetsuaki Ozaki, Kirishima (JP); Kazuya Imanaka, Kirishima (JP); Fumito Furuuchi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/057,495

(22) PCT Filed: Apr. 18, 2019

(86) PCT No.: PCT/JP2019/016631
§ 371 (c)(1),
(2) Date: Nov. 20, 2020

(87) PCT Pub. No.: WO2019/225235
PCT Pub. Date: Nov. 28, 2019

(65) Prior Publication Data
US 2021/0218046 A1    Jul. 15, 2021

(30) Foreign Application Priority Data
May 25, 2018  (JP) .............................. JP2018-100674

(51) Int. Cl.
*H01M 8/2475*   (2016.01)
*H01M 8/2428*   (2016.01)
*H01M 8/243*    (2016.01)

(52) U.S. Cl.
CPC ......... *H01M 8/2475* (2013.01); *H01M 8/243* (2013.01); *H01M 8/2428* (2016.02)

(58) Field of Classification Search
CPC ... H01M 8/2475; H01M 8/2428; H01M 8/243
See application file for complete search history.

(56) References Cited

U.S. PATENT DOCUMENTS

2013/0224630 A1   8/2013  Kwon et al.

FOREIGN PATENT DOCUMENTS

| EP | 3016190 A1 | | 5/2016 | |
|----|-----------|---|--------|---|
| JP | 2013-157191 A | | 8/2013 | |
| JP | 2014-006962 | * | 1/2014 | ............. H01M 8/24 |
| JP | 2016-171064 | * | 9/2016 | |

* cited by examiner

*Primary Examiner* — Helen Oi K Conley
(74) *Attorney, Agent, or Firm* — Procopio Cory Hargreaves and Savitch LLP

(57) ABSTRACT

A cell stack device including: a cell stack comprising a plurality of cells; a support member; and a fixing part between the support member and the at least one cell of the plurality of cells, wherein in a cross section including the support member, the fixing part, and the at least one cell, the fixing part includes: a first region arranged close to the support member; a second region closer to the at least one cell than the first region; and a third region between the first region and the second region, and at least one of the first region and the second region includes a porous region having a porosity that is higher than a porosity of the third region.

8 Claims, 6 Drawing Sheets

CELL STACK DEVICE, MODULE, AND MODULE HOUSING DEVICE

FIELD

The present disclosure relates to a cell stack device, a module, and a module housing device.

BACKGROUND

Recently, as the next generation energy, there has been proposed a fuel battery device housing, in its storage container, a cell stack device. The cell stack device includes a plurality of cells such as fuel battery cells, a current collecting member that electrically connects the plurality of cells to each other, and a gas tank. Lower end parts of the aligned standing cells and the current collecting member are fixed to a gas tank.

For example, in a fuel battery cell stack device disclosed in Patent Literature 1, one ends of a plurality of fuel battery cells are bonded to a support member by a fixing member.

CITATION LIST

Patent Literature

Non Patent Literature 1: Japanese Patent Application Laid-open No. 2013-157191

SUMMARY

Solution to Problem

A cell stack device according to the present disclosure includes a cell stack in which a plurality of cells is laminated; and a fixing member that fixes the plurality of cells. The fixing member includes: a support member that supports the plurality of cells; and a fixing part arranged between the support member and the plurality of cells. In a cross section including the support member, the fixing part, and at least one of the plurality of cells, the fixing part includes a first region arranged close to the support member; a second region arranged closer to the at least one cell than the first region; and a third region arranged between the first region and the second region. At least one of the first region and the second region includes a porous region having a porosity that is higher than a porosity of the third region.

A module according to the present disclosure includes: a storage container; and the above-mentioned cell stack device.

A module housing device according to the present disclosure includes: an external case; the above-mentioned module that is housed in the external case; and an auxiliary equipment that drives the module.

DESCRIPTION OF EMBODIMENTS

Cell

A solid oxide-type fuel battery cell will be explained as an example of a cell constituting a cell stack.

Figure 1A:
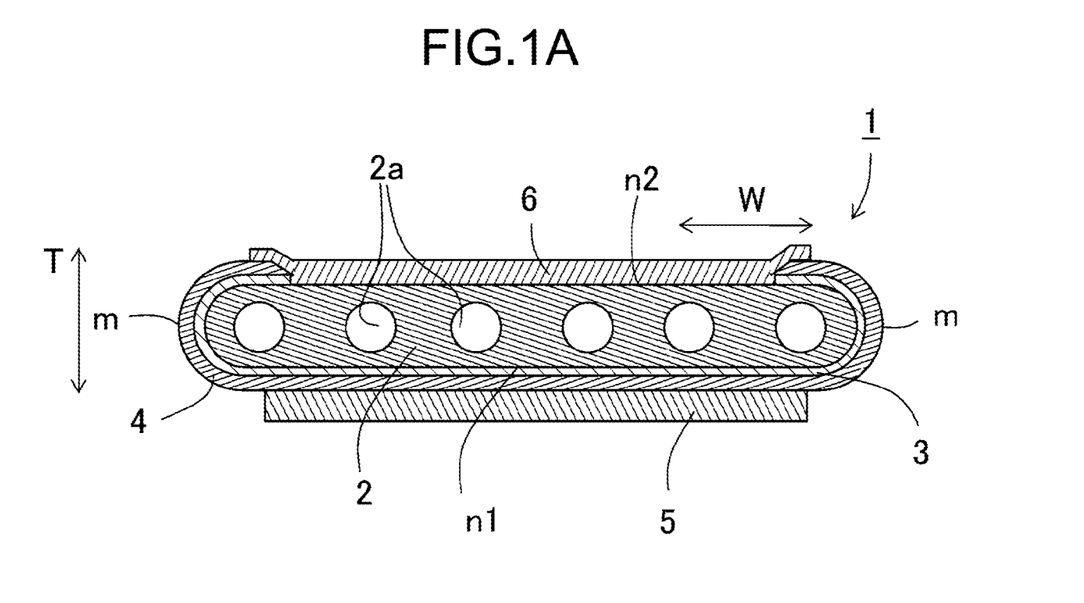
FIG. 1A is a lateral-cross-sectional view illustrating one example of a cell.
Figure 1B:
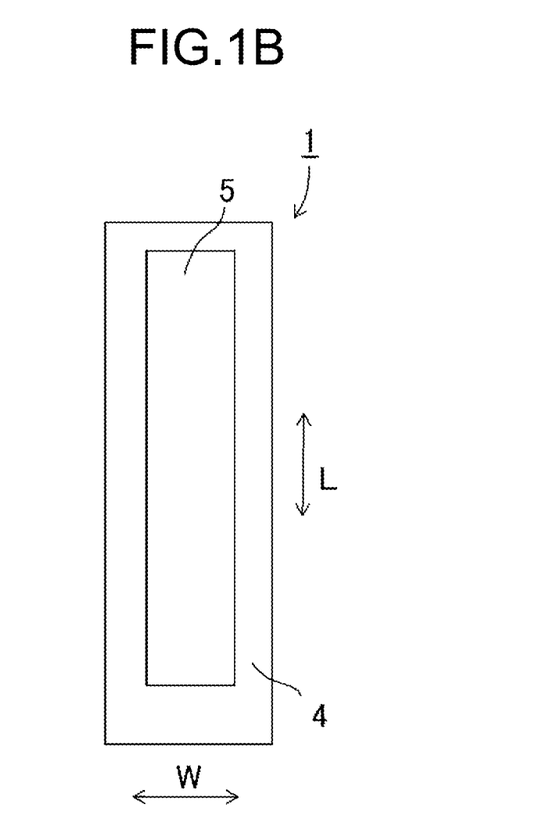
FIG. 1B is a bottom view illustrating the cell illustrated in FIG. 1A.
Figure 1C:
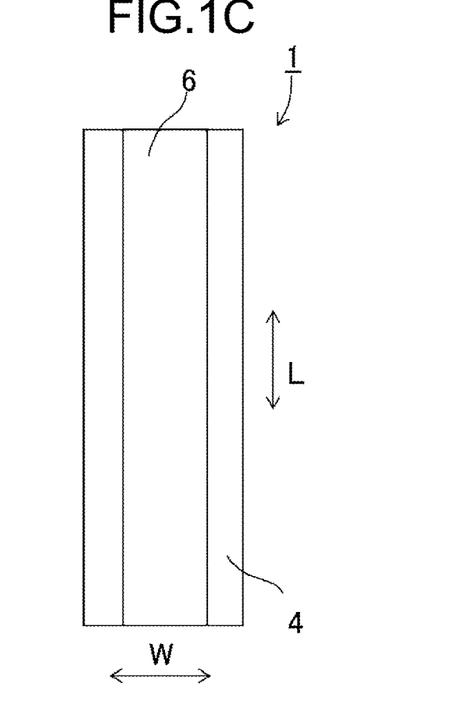
FIG. 1C is a top view illustrating the cell illustrated in FIG. 1A.

FIG. 1A is a lateral-cross-sectional view illustrating one example of the cell. FIG. 1B is a bottom view of FIG. 1A, in other words, a diagram illustrating a cell 1 viewed from an air electrode side. FIG. 1C is a top view of FIG. 1A, in other words, a diagram illustrating the cell 1 viewed from an inter-connector side. Note that in these drawings, a part of each configuration of the cell 1 is illustrated in an enlarged manner.

The cell 1 illustrated in FIG. 1A is hollow plate-shaped, and further elongated plate-shaped. As illustrated in FIG. 1B, the whole cell 1 in its side view is rectangular-shaped in which a length of a side in a length direction L is 5 to 50 cm and a length of a side in a width direction W, which is perpendicular to the length direction L, is 1 to 10 cm, for example. A thickness of the whole cell 1 is 1 to 5 mm. Hereinafter, a thickness direction of the cell 1 may be referred to as "T".

As illustrated in FIG. 1A, the cell 1 includes an electrically-conductive support substrate 2, an element part, and an inter-connector 6. Hereinafter, the electrically-conductive support substrate 2 may be simply referred to as "support substrate 2". The support substrate 2 is columnar-shaped including a pair of opposing flat surfaces n1 and n2, and a pair of arc-shaped side surfaces m connecting the flat surfaces n1 and n2 with each other. The support substrate 2 includes the element part on the flat surface n1. The element part includes a fuel electrode 3, a solid electrolyte layer 4, and an air electrode 5. In the example illustrated in FIG. 1, the cell 1 includes the inter-connector 6 arranged on the flat surface n2.

As indicated by the example illustrated in FIG. 1B, the air electrode 5 does not extend to a lower end of the cell 1. In a lower end part of the cell 1, the solid electrolyte layer 4 alone is exposed to the outside. As indicated by the example illustrated in FIG. 1C, the inter-connector 6 extends to a lower end of the cell 1. In a lower end part of the cell 1, the inter-connector 6 and the solid electrolyte layer 4 are exposed to the outside. Note that the solid electrolyte layer 4 is exposed to the outside at the pair of arc-shaped side surfaces m of the cell 1.

Hereinafter, configuration members constituting the cell 1 will be explained.

The support substrate 2 includes, in its inner part, gas flow paths 2a. The example illustrated in FIG. 1A includes the six gas flow paths 2a. The support substrate 2 has gas permeability for transmitting fuel gas to the fuel electrode 3. The support substrate 2 further has conductivity for performing current collection via the inter-connector 6. The support substrate 2 may contain an iron-group metal component and an inorganic oxide, for example. The iron-group metal component is Ni and/or NiO, and the inorganic oxide is a specific rare earth oxide, for example.

Well-known material such as porous electrically-conductive ceramic may be employed for the fuel electrode 3. The porous electrically-conductive ceramic may be formed of $ZrO_2$ into which a rare earth element oxide is solid-dissolved and Ni and/or NiO, for example. As the rare earth element oxide, $Y_2O_3$ and the like may be employed, for example. Hereinafter, $ZrO_2$ into which a rare earth element oxide is solid-dissolved may be collectively referred to as a stabilized zirconia. The stabilized zirconia includes one a part of which is stabilized.

The solid electrolyte layer 4 has a function as electrolyte that is a bridge for an electron between the fuel electrode 3 and the air electrode 5. The solid electrolyte layer 4 further has a gas shut-off property so as to prevent leakage of fuel gas and gas containing oxygen. The solid electrolyte layer may be $ZrO_2$ into which 3 to 15 mol % of a rare earth element oxide is solid-dissolved. As the rare earth oxide, for example, $Y_2O_3$ and the like may be employed. Note that another material may be employed for a material of the solid electrolyte layer 4 as long as the above-mentioned features are maintained.

The air electrode 5 is not particularly limited as long as it is generally used. The air electrode 5 may be an electrically-conductive ceramic made of i.e. $ABO_3$ perovskite-type oxide, for example. Moreover, the perovskite-type oxide may be a composite oxide in which Sr and La coexist at A sites, for example. As an example, $La_xSr_{1-x}Co_yFe_{1-y}O_3$, $La_xSr_{1-x}MnO_3$, $La_xSr_{1-x}FeO_3$, $La_xSr_{1-x}CoO_3$, and the like may be exemplified as the composite oxide in which Sr and La coexist at A sites. Note that x satisfies 0<x<1, and y satisfies 0<y<1. The air electrode 5 has gas permeability. An open porosity of the air electrode 5 may be within a range of equal to or more than 20%, particularly 30 to 50%, for example.

For the inter-connector 6, a lanthanum-chromite perovskite-type oxide ($LaCrO_3$-type oxide) or a lanthanum-strontium-titanium perovskite-type oxide ($LaSrTiO_3$-type oxide) may be employed as its material. Each of the materials has electrical conductivity, and is not reduced or oxidized even when being exposed to fuel gas, such as gas containing hydrogen, or gas containing oxygen such as air.

The inter-connector 6 is dense so as to prevent leakage of fuel gas flowing through the gas flow paths 2a formed in the support substrate 2 and gas containing oxygen flowing through an outside of the support substrate 2. The inter-connector 6 may have a relative density of equal to or more than 93%, particularly equal to or more than 95%.

Cell Stack Device

Figure 2A:
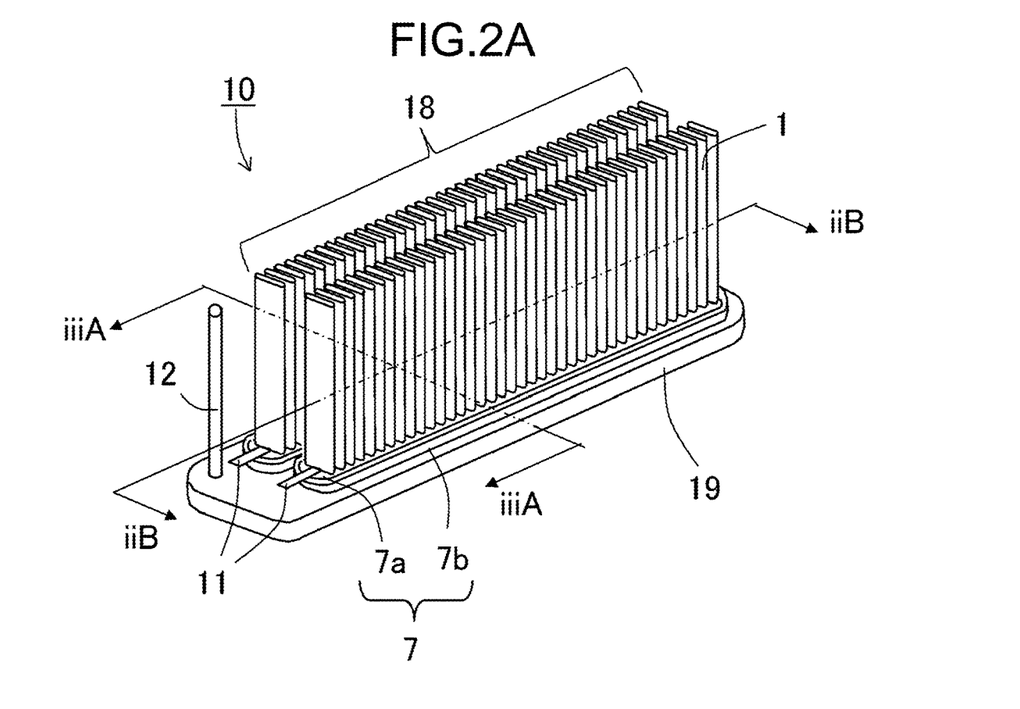
FIG. 2A is a perspective view illustrating one example of a cell stack device.
Figure 2B:
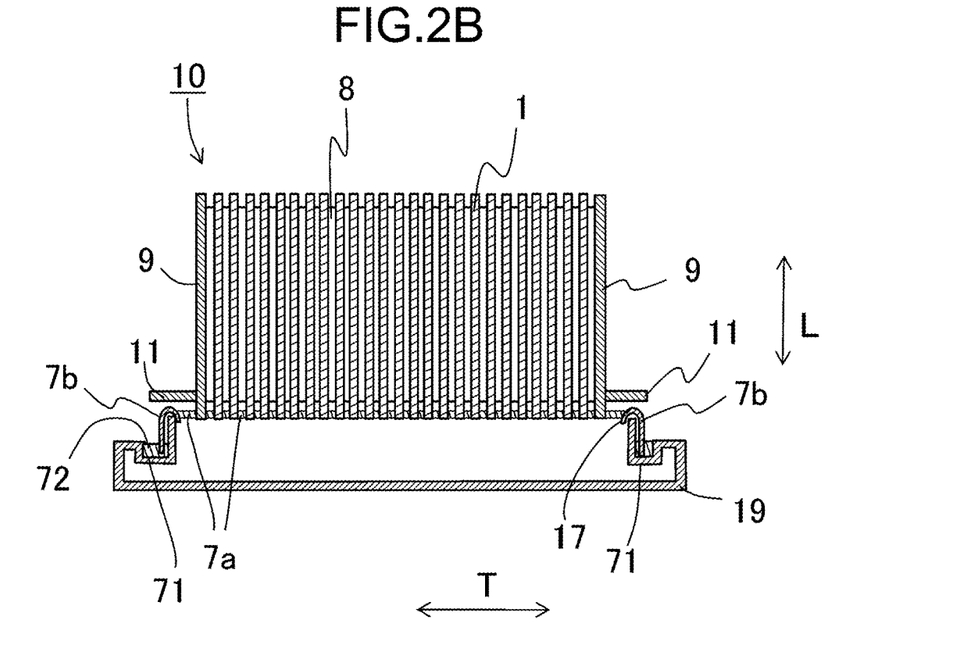
FIG. 2B is a cross-sectional view taken along a line iiB-iiB illustrated in FIG. 2A.

FIG. 2A is a perspective view illustrating one example of a cell stack device according to the embodiments, and FIG. 2B is a cross-sectional view taken along a line iiB-iiB illustrated in FIG. 2A.

A cell stack device 10 includes a cell stack 18 including the plurality of cells 1 aligned or laminated along the thickness direction T of the cells 1, and a fixing member 7. The cell stack 18 includes an end-part electrically-conductive member 9 at each of both ends thereof in an alignment direction of the plurality of cells 1.

As illustrated in FIGS. 2A and 2B, the fixing member 7 includes a fixing part 7a and a support member 7b.

The support member 7b includes an insertion hole 17 into which one ends of the plurality of cells 1 are inserted. The one ends of the plurality of cells 1 are bonded to an inner wall of the insertion hole 17 by using the fixing part 7a, and the support member 7b supports the plurality of cells 1. One end of the support member 7b is bonded to a gas tank 19.

The gas tank 19 includes a recessed groove 71 arranged in an opening of the gas tank 19 and on the periphery of the opening. One end of the support member 7b is bonded to the gas tank 19 by using a bonding material 72 having filled the recessed groove 71. The gas tank 19 supplies, to the plurality of cells 1, fuel gas through the opening and the insertion hole 17 of the support member 7b.

The support member 7b and the gas tank 19 are formed of metal and have electrical conductivity.

In the example illustrated in FIGS. 2A and 2B, fuel gas is stored in an internal space formed by the support member 7b and the gas tank 19. A gas flow tube 12 is connected with the gas tank 19. Fuel gas that is generated by a reformer 13 to be mentioned later is supplied to the gas tank 19 via the gas flow tube 12, and then the fuel gas is supplied, from the gas tank 19, to the gas flow paths 2a in the cells 1.

Hydrogen-rich fuel gas may be generated by performing steam reforming and the like on raw fuel. The fuel gas generated by steam reforming contains water vapor.

The example illustrated in FIGS. 2A and 2B includes two rows of the cell stacks 18 in each of which the plurality of cells 1 is aligned, and the two support members 7b; and the cell stacks 18 are fixed to the respective support members 7b. In this case, the gas tank 19 has, on its upper surface, two through holes (openings). Each of the support members 7b is arranged with respect to the corresponding through hole (opening) in such a manner that the support member 7b coincides with the insertion hole 17. As a result, an internal space is formed by the single gas tank 19 and the double support members 7b.

The insertion hole 17 may be oval-shaped in the top view, for example. The insertion hole 17 is longer than a distance between two end-part electrically-conductive members 9b in an alignment direction of the cells 1, for example. Moreover, a width of the insertion hole 17 is longer than a length of the cell 1 in the width direction W, for example.

As illustrated in FIGS. 2A and 2B, the cell stack device 10 includes a bonding part obtained by filling the solidified fixing part 7a between the insertion hole 17 and the one ends of the cells 1. Thus, the insertion hole 17 and the one ends of the plurality of cells 1 are bonded and fixed to each other, and one ends of the adjacent cells 1 are bonded to each other. One ends of the gas flow paths 2a of the cells 1 are communicated with an internal space of the fixing member 7.

Material having a low electrical conductivity may be employed for the fixing part 7a and the bonding material 72. As a specific material, amorphous glass, crystallized glass, and the like are exemplified. As the crystallized glass, for example, $SiO_2$—$CaO$ type, $MgO$—$B_2O_3$ type, $La_2O_3$—$B_2O_3$—$MgO$ type, $La_2O_3$—$B_2O_3$—$ZnO$ type, $SiO_2$—$CaO$—$ZnO$ type, and $SiO_2$—$MgO$ type may be employed.

The cell stack device 10 illustrated in FIG. 2B includes an electrically-conductive member 8 between the adjacent two cells 1. The electrically-conductive member 8 electrically connects in serial the fuel electrode 3 of one of the adjacent cells 1 with the air electrode 5 of the other of the adjacent cells 1. In FIG. 2A, illustration of the electrically-conductive member 8 is omitted.

In the cell stack device 10 illustrated in FIG. 2B, the end-part electrically-conductive members 9 are connected with the cells 1 positioned on outermost sides in the alignment direction of the plurality of cells 1. Each of the end-part electrically-conductive members 9 includes an electrically-conductive part 11 protruding toward the outside from the cell stack 18. The electrically-conductive part 11 has a function of performing current collection on electricity that is generated by power generation of the cells 1 and further leading the collected electricity to the outside.

Figure 3A:
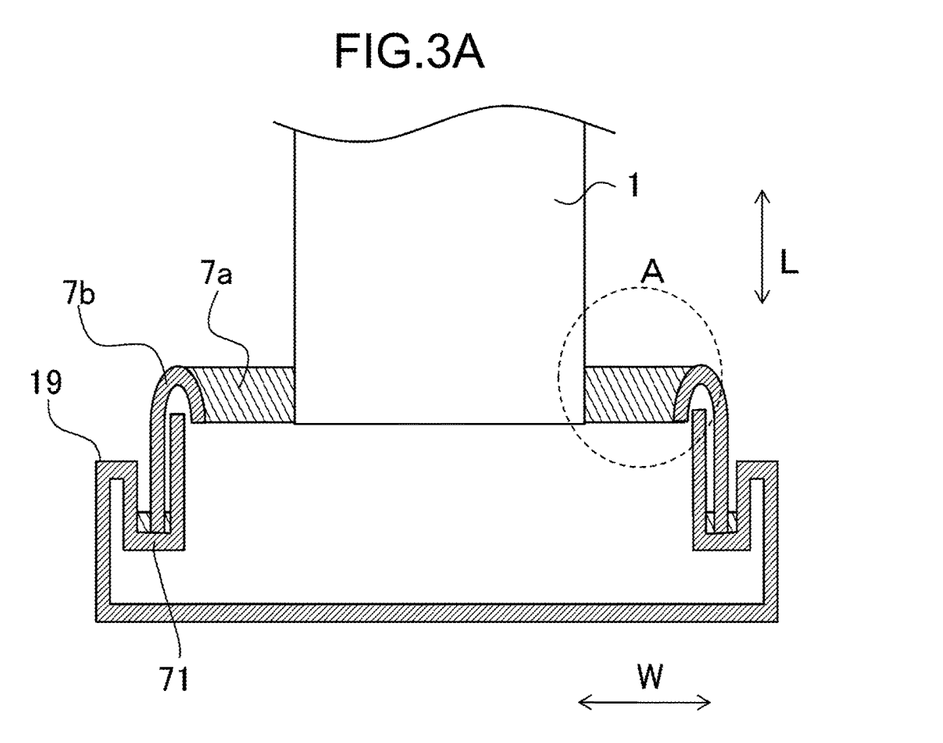
FIG. 3A is a cross-sectional view taken along a line iiiA-iiiA illustrated in FIG. 2A.
Figure 3B:
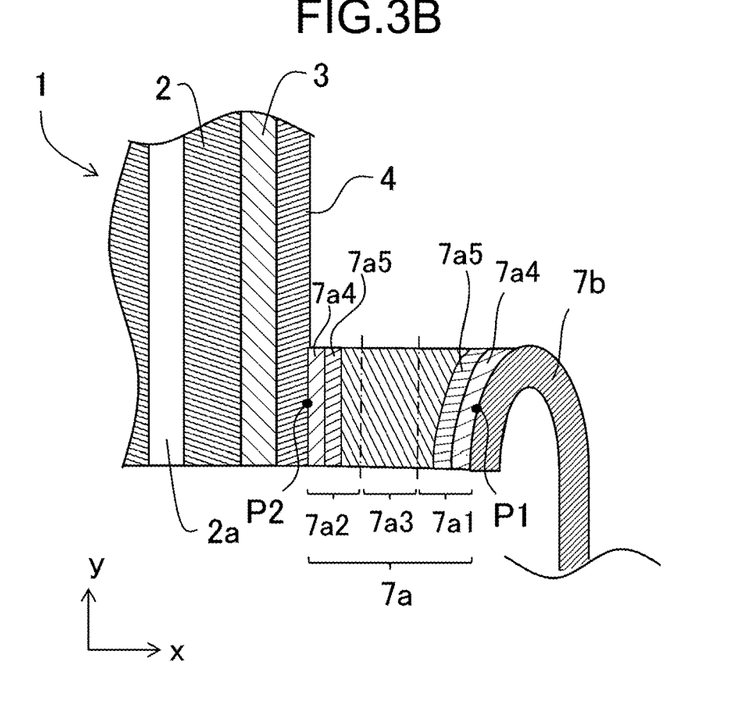
FIG. 3B is an enlarged view illustrating one example of a region A illustrated in FIG. 3A.

FIG. 3A is one example of a cross-sectional view illustrating the cell stack device 10, and corresponds to a cross section taken along a line iiiA-iiiA illustrated in FIG. 2A. Note that in FIG. 2A, there is indicated an example that includes two rows of the cell stacks 18 and the two support members 7b; however, in FIG. 3A, there is indicated an example that includes single row of the cell stack 18 and the single support member 7b. FIG. 3B is an enlarged view illustrating the region A illustrated in FIG. 3A. In other words, FIGS. 3A and 3B are cross-sectional views illustrating the support member 7b, the fixing part 7a, and the cell 1.

In FIGS. 3A and 3B, the cell 1 is opposite to the support member 7b via the fixing part 7a. In other words, the cell 1 and the support member 7b are on opposite sides of the fixing part 7a. In an arbitrary cross section including the support member 7b, the fixing part 7a, and the cell 1, a first direction x is defined as a direction in which the cell 1 and the support member 7b are opposite to each other, and a second direction y is defined as a direction that is perpendicular to the first direction x. In FIG. 3A, the first direction x corresponds to the width direction W, and the second direction y corresponds to the length direction L.

As illustrated in FIG. 3B, the solid electrolyte layer 4 of the cell 1 and the fixing part 7a are in contact with each other. The cell 1 includes, inside of the solid electrolyte layer 4, the porous and electrically-conductive fuel electrode 3. The cell 1 may include a cell reinforcing layer between the solid electrolyte layer 4 and the fixing part 7a. The cell reinforcing layer may be formed of material whose main component is $ZrO_2$ into which 3 to 15 mol % of $Y_2O_3$ is solid-dissolved with respect to a content of a rare earth element, for example.

As illustrated in FIG. 3B, in the cross section including the support member 7b, the fixing part 7a, and the cell 1, the fixing part 7a may be divided into a first region 7a1, a second region 7a2, and a third region 7a3. The first region 7a1 is closer to the support member 7b, and the second region 7a2 is closer to the cell 1. The third region 7a3 is arranged between the first region 7a1 and the second region 7a2.

Specifically, in the cross section including the support member 7b, the fixing part 7a, and the cell 1, the first region 7a1, the second region 7a2, and the third region 7a3 are defined as described below. A center position of the fixing part 7a in the second direction y on a boundary between the fixing part 7a and the support member 7b is defined as a first position P1. A center position of the fixing part 7a in the second direction y on a boundary between the fixing part 7a and the cell 1 is defined as a second position P2. A length of a line between the first position P1 and the second position P2 is trisected in the first direction x, and two imaginary lines are drawn in the second direction y from respective trisected points. A region between a first imaginary line of the two imaginary lines, which is closer to the support member 7b, and the support member 7b is defined as the first region 7a1. A region between a second imaginary line of the two imaginary lines, which is closer to the cell 1, and the cell 1 is defined as the second region 7a2. A region between the first imaginary line and the second imaginary line is defined as the third region 7a3.

When the cell stack device 10 of the above-mentioned fuel battery cell is operating, for example, fuel gas such as gas containing hydrogen at a high temperature of 600° C. to 800° C. and "gas containing oxygen element" such as air are passed therethrough. The fuel gas is led to an internal space of the support member 7b, and then individually led to the gas flow paths 2a of the plurality of cells 1. Fuel gas having passed the gas flow paths 2a is ejected to the outside from the other ends of the gas flow paths 2a, which are free ends. The air is supplied to gaps between the adjacent cells 1 so as to flow in the longitudinal direction of the cells 1.

In the above-mentioned cell stack device 10, a crack easily occurs near a boundary between the fixing part 7a and the cell 1 that is a fixed member, or between the fixing part 7a and the support member 7b that is also a fixed member.

In one example of the cell stack device 10 according to the present disclosure, the fixing part 7a illustrated in FIG. 3B includes, in at least one of the first region 7a1 and the second region 7a2, a porous region 7a4 whose porosity is higher than that of the third region 7a3.

The cell stack device 10 is capable of buffering stress having occurred in a boundary between the fixing part 7a and a member fixed thereto by using the porous region 7a4. As a result, occurrence of a crack near the boundary is able to be reduced, so that it is possible to improve durability of the cell stack device 10.

FIG. 3A is a cross-sectional view in the width direction W and the length direction L of the cell stack device 10. In the present disclosure, the cross section including the support member 7b, the fixing part 7a, and the cell 1 may be a cross section in the thickness direction T and the length direction L. However, the cross section including the support member 7b, the fixing part 7a, and the cell 1 does not include a cross section in the width direction W and the thickness direction T, in other words, a cross section perpendicular to the length direction L. In other words, the cross section including the support member 7b, the fixing part 7a, and the cell 1 according to the present disclosure is a cross section along the length direction L, and is a cross section including both of a surface of the fixing part 7a which is exposed to the fuel gas and a surface of the fixing part 7a exposed to the gas containing oxygen.

The first region 7a1 includes the first boundary region that is in contact with the support member 7b. The second region 7a2 includes the second boundary region that is in contact with the cell. At least one of the first boundary region and the second boundary region may be the porous region 7a4. In the first region 7a1 illustrated in FIG. 3B, the first boundary region and the second boundary region are the porous regions 7a4. By employing the configuration, occurrence of a crack in a boundary between the fixing part 7a and a member fixed thereto is able to be further reduced, so that it is possible to further improve durability of the cell stack device 10.

At least one of the first region 7a1 and the second region 7a2 may include a dense region 7a5. The dense region 7a5 is adjacent to the porous region 7a4 on the third region 7a3 side, and has a porosity lower than that of the third region 7a3. Even when the porous region 7a4 absorbs the fuel gas and the gas containing oxygen and water vapor is generated in the porous region 7a4, at least one of the first region 7a1 and the second region 7a2 includes the dense region 7a5, and thus absorption of the water vapor into the third region 7a3 from the porous region 7a4 is reduced. As a result, corrosion of the fixing part 7a due to the water vapor is reduced, so that it is possible to improve durability of the cell stack device 10.

A material of the porous region 7a4 illustrated in FIG. 3B may be the same as or similar to that of another region in the fixing part 7a.

A porosity of the porous region 7a4 is higher than that of the third region 7a3. A porosity of the porous region 7a4 may be 10% to 40%, for example. A porosity of a region other than the porous region 7a4 in the fixing part 7a may be less than 15%, for example.

A thickness of the porous region 7a4 in the first direction x may be 1 µm to 200 µm. A thickness of the dense region 7a5 in the first direction x may be 1 µm to 200 µm.

When the first boundary region or the second boundary region is the porous region 7a4, a thickness of the porous region 7a4 in the first direction x may be 1 µm to 200 µm from a boundary between the fixing part 7a and the member fixed thereto. A thickness of the dense region 7a5 in the first direction x may be 1 µm to 200 µm from the porous region 7a4.

The porous region 7a4 may be arranged only in a portion of the fixing part 7a, in which a crack particularly easily occurs.

The first boundary region may be the porous region 7a4, and a porosity of the porous region 7a4 may be higher than that of the second boundary region. Although a crack particularly easily occurs in the first boundary region, the first boundary region is the porous region 7a4 having a porosity higher than that of the second boundary region, and thus occurrence of a crack in the first boundary region is further reduced, so that it is possible to improve durability of the cell stack device 10.

Details of reason why a crack easily occurs in the first boundary region has been unknown; however, may be considered as described below.

For example, when a positive voltage is applied to the cell 1 with respect to the support member 7b, a metal element contained in the fixing part 7a receives an electron from the electrically-conductive support member 7b near a boundary between the fixing part 7a and the support member 7b. Accordingly, oxygen bonded to the metal element, in other words, oxygen contained in an oxide film of a metal surface is separated as an oxide ion. The negative-charged oxide ion moves toward the cell 1 to which the positive voltage is applied. When having reached the fuel electrode 3 that is a porous electrical conductor, the moved oxide ion emits an electron and oxygen into the fuel electrode 3. As a result, oxygen is constantly reduced near a boundary between the fixing part 7a and the support member 7b.

The oxygen contained in the fixing part 7a is reduced near the boundary between the fixing part 7a and the support member 7b, in other words, the fixing part 7a on the periphery of the boundary between the fixing part 7a and the support member 7b is reduced. As a result, it is considered that an oxygen defect occurs in the fixing part 7a to generate a vacancy, and thus a crack is generated in the fixing part 7a near the boundary between the fixing part 7a and the support member 7b.

On the other hand, when a negative voltage is applied to the cell 1 with respect to the support member 7b, a negative-charged oxide ion contained in the cell 1 moves toward the support member 7b having an electric potential higher than that of the cell 1. When having reached a surface of the metal support member 7b, an oxide ion having moved through the fixing part 7a from the cell 1 emits an electron into the support member 7b, in other words, metal so as to increase an oxide film of a metal surface. As a result, a crack occurs near the boundary between the support member 7b and the fixing part 7a.

Figure 4:
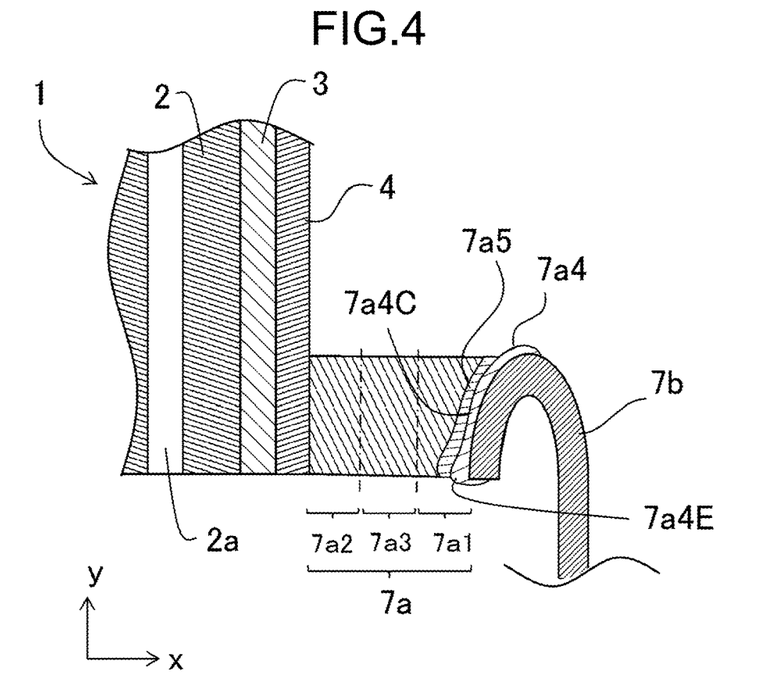
FIG. 4 is an enlarged view illustrating one example of the region A illustrated in FIG. 3A.

FIG. 4 is an enlarged view illustrating one example of the region A of the cell stack device 10. In FIG. 4, the illustrated cross section is in the width direction W and the length direction L, the first direction x indicates the width direction W, and the second direction y indicates the length direction L.

In FIG. 4, the porous region 7a4 is provided to the first region 7a1 alone. In the example illustrated in FIG. 4, the first boundary region is the porous region 7a4.

A position between the cell 1 and the support member 7b in the first direction x may be referred to as an opposite position. As illustrated in FIG. 4, the cell stack device 10 may include the porous region 7a4 on a surface of the support member 7b other than the opposite position. In the example illustrated in FIG. 4, the porous region 7a4 further extends in the second direction y from the opposite position. The porous region 7a4 may extend over the whole surface of the support member 7b.

In the example illustrated in FIG. 4, the porous region 7a4 includes an end part 7a4E in the second direction y and a center part 7a4C in the second direction y. A thickness of the end part 7a4E in the first direction x is larger than a thickness of the center part 7a4C in the first direction x. In the first boundary region, although a crack easily occurs from the end part 7a4E, a thickness of the end part 7a4E in the first direction x is larger than a thickness of the center part 7a4C in the first direction x, and thus occurrence of a crack from the end part 7a4E of the first boundary region is reduced. In FIG. 4, the thickness of the end part 7a4E exposed to the fuel gas is larger than that of the center part 7a4C; however, the thickness of the end part 7a4E exposed to the gas containing oxygen may be larger than that of the center part 7a4C. The second boundary region may have a configuration that is the same as or similar to that of the above-mentioned first boundary region.

The porous region 7a4 may have electrical insulation. Thus, transfer of an electron between the fixing part 7a and the support member 7b is reduced, so that it is possible to reduce occurrence of a crack near the boundary between the fixing part 7a and the support member 7b.

Material of the porous region 7a4 may differ from that of a region of the fixing part 7a other than the porous region 7a4. The material of the porous region 7a4 may have a comparatively-low electrical conductivity, such as forsterite, alumina, and cordierite.

The porosity of each region in the fixing part 7a may be analyzed by the following method. First, as illustrated in FIG. 3B, an image of a cross section including the cell 1, the fixing part 7a, and the support member 7b are obtained by using a scanning electron microscope (SEM). A binarization treatment is performed on the obtained image to determine pores. From the image on which the binarization treatment has been performed, a ratio occupied by pores in each region, in other words, the porosity is able to be calculated.

One example of a specific analysis procedure will be explained. First, a porosity of the third region 7a3 is calculated. The calculated porosity of the third region 7a3 is defined as reference porosity. Next, a porosity of a region whose thickness is 1 µm from the support member 7b (fixed member) toward the third region 7a3 is calculated. When the porosity of the first measurement region is higher than the reference porosity, a region whose thickness is 1 µm from the first measurement region toward the third region 7a3 is defined as a second measurement region, and a porosity of the second measurement region is calculated. When the porosity of the second measurement region is higher than the reference porosity, a region whose thickness 1 µm from the second measurement region toward the third region 7a3 is defined as a third measurement region and a porosity of the third measurement region is calculated. When the porosity of the third measurement region is equal to or less than the reference porosity, a region obtained by totaling the first measurement region and the second measurement region, in other words, a region whose thickness is 2 µm from the support member 7b is specified to be the porous region 7a4. Furthermore, a region whose thickness is 1 µm from the third measurement region toward the third region 7a3 is defined as a fourth measurement region, and a porosity of the fourth measurement region is calculated. When the porosity of the fourth measurement region is lower than the reference porosity, a region whose thickness is 1 µm from the fourth measurement region toward the third region 7a3 is defined as a fifth measurement region, and a porosity of the fifth measurement region is calculated. When the porosity of the fifth measurement region is equal to or more than the reference porosity, a region obtained by totaling the third measurement region and the fourth measurement region, in other words, a region whose thickness is 2 µm from the second measurement region is specified to be the dense region 7a5.

Note that in the above-mentioned example, one ends of all of the cells 1 in one row are inserted into the single insertion hole 17 formed in the support member 7b; however, the cells 1 may be inserted into the plurality of respective insertion holes 17 formed in the support member 7b.

A method for manufacturing the cell stack device 10 illustrated in FIG. 3B will be explained. First, by using a common film forming method and the above-mentioned material, a film constituting the porous region 7a4 is film-formed on a surface of the support member 7b and surfaces of the plurality of cells 1. When the film-formed film is sintered, the porous region 7a4 is able to be arranged on the surface of the support member 7b and the surfaces of the plurality of cells 1. In a case where a dipping method is employed for the film-forming method, for example, when film-forming is executed by using material containing pore forming material, the porosity is able to be adjusted. In a case where a vacuum evaporation method, an electrodeposition method, a sputtering method, or the like are employed, when the density of a film is adjusted, the porosity is able to be adjusted.

Next, the plurality of cells 1 is aligned in a stacked manner and is fixed by using a predetermined jig and the like. Next, one ends of the plurality of cells 1 in the aligned state are inserted into the insertion hole 17 of the support member 7b. Next, a gap between the insertion hole 17 and the one ends of the plurality of cells 1 is filled with paste of an amorphous glass or the like.

Next, a thermal treatment is performed on the paste that is filled as described above so as to crystallize the amorphous glass. When a temperature of the amorphous material such as amorphous glass reaches its crystallization temperature by the thermal treatment, a crystal phase is generated in the amorphous material and crystallization is advancing so as to form the fixing part 7a. After the thermal treatment, the jig is removed from the plurality of cells 1.

When sintering aid is coated on a surface of a layer of the porous region 7a4 having been formed on the support member 7b and the cells 1 before the gap between the insertion hole 17 and one ends of the cells 1 is filled with the paste of the amorphous glass or the like, a region adjacent to the porous region 7a4 in the fixing part 7a is obtained as the dense region 7a5.

Finally, the support member 7b is bonded to the gas tank 19. In the process, the recessed groove 71 of the gas tank 19 is filled with paste for the bonding material 72. The support member 7b may be arranged into the recessed groove 71 having been filled with the paste, and then a thermal treatment is performed on the paste for crystallization. In this way, the cell stack device 10 is able to be manufactured.

Module

Figure 5:
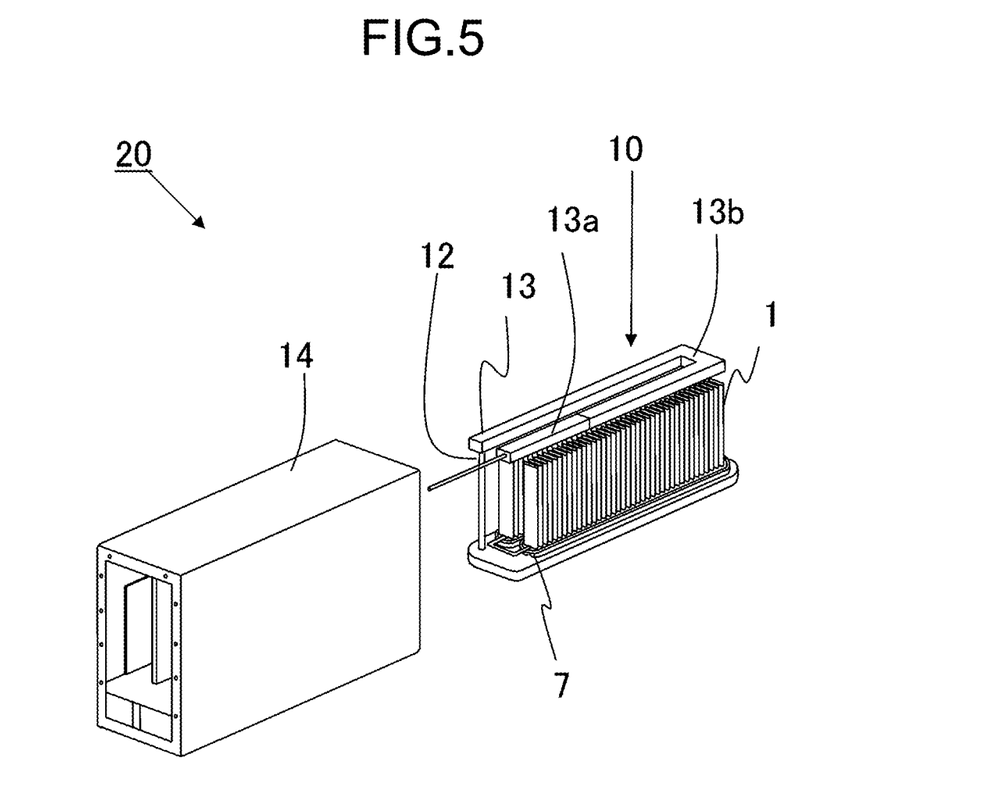
FIG. 5 is an exterior perspective view illustrating one example of a module.

FIG. 5 is an exterior perspective view illustrating one example of a module including the cell stack device.

A module 20 includes a storage container 14 and the cell stack device 10 that is housed in the storage container 14. The reformer 13 is arranged on or above the cell stack device 10.

The reformer 13 reforms raw fuel such as natural gas and kerosene so as to generate fuel gas, and supplies the reformed raw fuel to the cells 1. The raw fuel is supplied to the reformer 13 via a raw-fuel supplying tube. The reformer 13 may include a vaporization unit 13a that vaporizes water and a reforming unit 13b. The reforming unit 13b includes a reforming catalyst (not illustrated) so as to reform the raw fuel into fuel gas. The above-mentioned reformer 13 is capable of performing steam reforming that is an efficient reforming reaction.

Fuel gas generated by the reformer 13 is supplied to the gas flow paths 2a of the cells 1 via the gas flow tube 12, the gas tank 19, and the support member 7b.

In FIG. 5, there is illustrated a state where a part (front and back surfaces) of the storage container 14 are removed, and the cell stack device 10 housed in the storage container 14 is moved therefrom in the back direction.

In the above-mentioned module 20, a temperature in the module 20 during normal power generation is 500° C. to 1000° C. in accordance with the above-mentioned firing of gas and power generation of the cells 1.

When there is employed, as the cell stack device 10 of the module 20, the cell stack device 10 including the above-mentioned fixing part 7a having the porous region 7a4, occurrence of a crack in the fixing part 7a is able to be reduced, so that it is possible to obtain the module 20 having a high durability.

Module Housing Device

Figure 6:
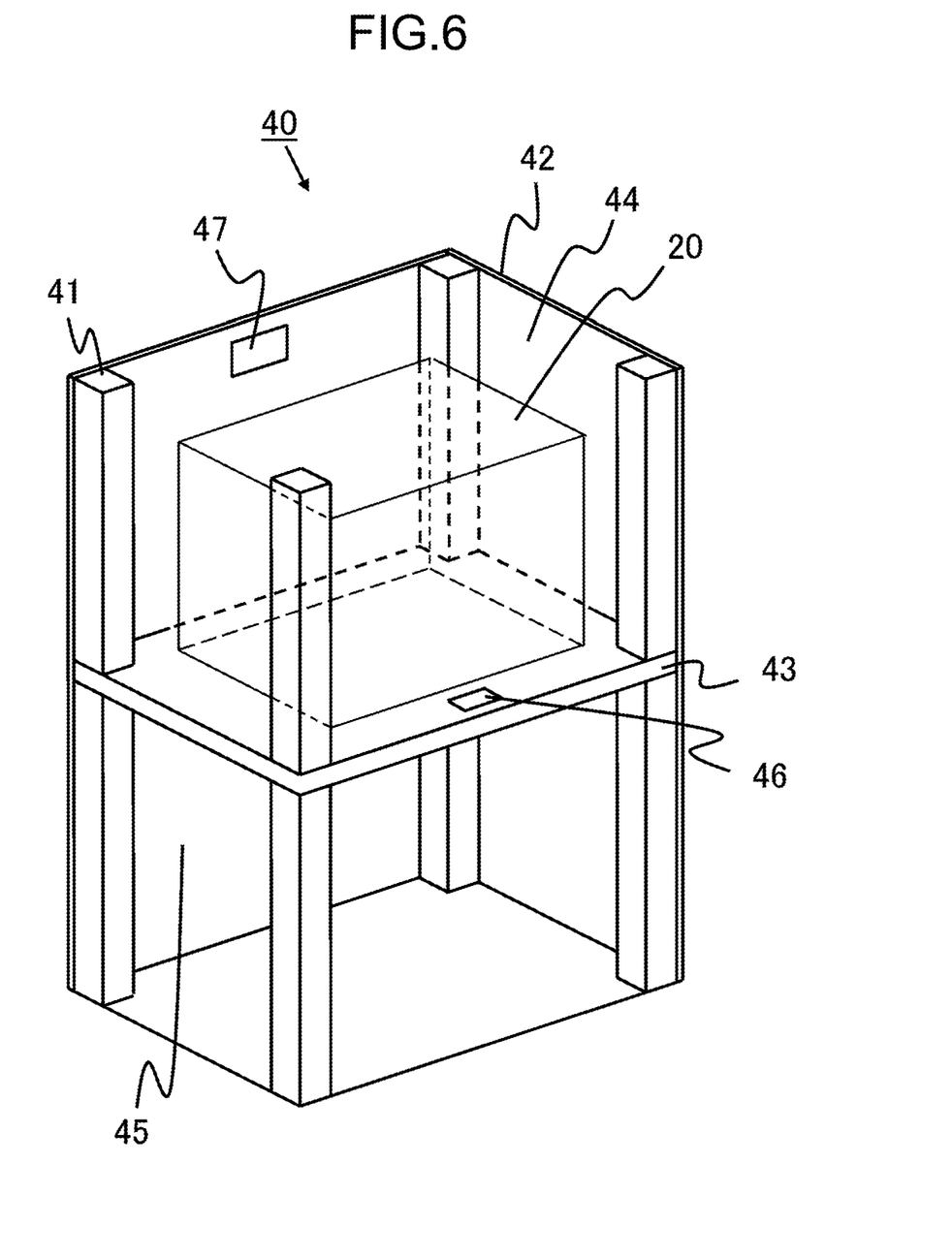
FIG. 6 is an exploded perspective view schematically illustrating one example of a module housing device.

FIG. 6 is an exploded perspective view illustrating one example of a module housing device. Note that in FIG. 6, illustration of a part of the configuration is omitted. The module housing device includes an external case, a module that is housed in the external case, and an auxiliary equipment that drives the module.

An external case of a module housing device 40 illustrated in FIG. 6 includes pillars 41 and external plates 42. A partition plate 43 vertically divides an inner space of the external case. A space upper than the partition plate 43 in the external case is a module housing chamber 44 that houses therein the module 20, and a space lower than the partition plate 43 in the external case is an auxiliary-equipment housing chamber 45 that houses therein an auxiliary equipment for driving the module 20. Note that illustration of the auxiliary equipment housed in the auxiliary-equipment housing chamber 45 is omitted.

An air vent port 46 through which air in the auxiliary-equipment housing chamber 45 flows into the module housing chamber 44 is provided to the partition plate 43. An exhaust port 47 that exhausts air in the module housing chamber 44 is arranged on a part of the external plates 42 constituting the module housing chamber 44.

The above-mentioned module 20 having a high durability is housed in the module housing chamber 44 of the module housing device 40, so that it is possible to obtain the module housing device 40 having a high durability.

As described above, the present disclosure is specifically explained; however, the present disclosure is not limited to the above-mentioned embodiments. Various substitutions and changes in the form of the embodiments described herein may be made on the cell stack device, the module, and the module housing device according to the present disclosure The present disclosure is not limited to, i.e. "vertically-striped" configuration in which a single power-generating element part including a fuel electrode, a solid electrolyte layer, and an air electrode is arranged on a surface of the above-mentioned support substrate. The cell stack device according to the present disclosure may be employed for a horizontally-striped cell stack device obtained by laminating, i.e. "horizontally-striped" cells, in which a plurality of power-generating element parts is arranged at a plurality of respective separated positions on the surface of the support substrate, and the adjacent power-generating element parts are electrically connected to each other. Moreover, the cell stack device according to the present disclosure may be employed for a planar-type cell stack device obtained by laminating, i.e. planar-type cells in a thickness direction thereof.

In the above-mentioned embodiments, a fuel battery cell, a fuel battery cell stack device, a fuel battery module, and a fuel battery device are indicated as examples of "cell", "cell stack device", "module", and "module housing device"; however, may be an electrolytic cell, an electrolytic cell device, an electrolytic module, and an electrolytic device as another example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell stack device comprising:
a cell stack comprising a plurality of cells;
a support member; and
a fixing part between the support member and at least one cell of the plurality of cells, wherein
in a cross section including the support member, the fixing part, and the at least one cell, the fixing part includes:
a first region arranged close to the support member;
a second region closer to the at least one cell than the first region; and
a third region between the first region and the second region, and
at least one of the first region and the second region includes a porous region having a porosity that is higher than a porosity of the third region.

2. The cell stack device according to claim 1, wherein the first region includes a first boundary region that is in contact with the support member,
the second region includes a second boundary region that is in contact with the at least one cell, and
at least one of the first boundary region and the second boundary region is the porous region.

3. The cell stack device according to claim 2, wherein the support member has electrical conductivity, and
the first boundary region is the porous region, and has electrical insulation.

4. The cell stack device according to claim 2, wherein the support member has electrical conductivity, and
the first boundary region is the porous region, and the porosity of the porous region is higher than a porosity of the second boundary region.

5. The cell stack device according to claim 3, wherein the at least one cell and cells are opposite to the support member are on opposite sides of the fixing part,
in the cross section including the support member, the fixing part, and the at least one cell, and having a first direction from the at least one cell to a part of the support member, the part opposite to the at least one cell, and a second direction perpendicular to the first direction, the porous region includes an end part and a center part in the second direction, and
a thickness of the end part in the first direction is larger than a thickness of the center part.

6. The cell stack device according to claim 1, wherein at least one of the first region and the second region is adjacent to the porous region on a third region side, and includes a dense region having a porosity that is lower than that of the third region.

7. A module comprising:
a storage container; and
the cell stack device according to claim 1 which is housed in the storage container.

8. A module housing device comprising:
an external case;
the module according to claim 7 which is housed in the external case; and
an auxiliary equipment that drives the module.

* * * * *